United States Patent [19]

Senda et al.

[11] Patent Number: 5,728,328
[45] Date of Patent: Mar. 17, 1998

[54] METHOD OF MOLDING A PRODUCT HAVING LOW GLOSS SURFACE

[75] Inventors: Masanobu Senda, Inazawa; Yasuhiko Ogisu, Nagoya, both of Japan

[73] Assignee: Toyoda Gosei Co., Ltd., Aichi-Ken, Japan

[21] Appl. No.: 622,160

[22] Filed: Mar. 27, 1996

[30] Foreign Application Priority Data

Mar. 27, 1995 [JP] Japan ................................. 7-068316
Jun. 13, 1995 [JP] Japan ................................. 7-146548
Dec. 13, 1995 [JP] Japan ................................. 7-324616

[51] Int. Cl.$^6$ ................................................. B29C 33/56
[52] U.S. Cl. ........................... 264/39; 264/338; 249/114.1
[58] Field of Search .................... 264/39, 338; 249/114.1

[56] References Cited

U.S. PATENT DOCUMENTS 4,534,921  8/1985  Fierkens et al. ............................. 264/39
5,008,002  4/1991  Uno et al. ................................... 264/338

FOREIGN PATENT DOCUMENTS 6-143293  5/1994  Japan.
6248417   9/1994  Japan.

Primary Examiner—James Derrington
Attorney, Agent, or Firm—Cushman Darby & Cushman IP Group of Pillsbury Madison & Sutro, LLP

[57] ABSTRACT

A method for manufacturing a resin product with a mold having at least two molds opposed to each other. Each of the molds 5 has a cavity surface defining a space therebetween. The method includes the steps of performing an ionic nitriding treatment to at least a part of at least one cavity surface to form fine projections and recesses therein. A nitride layer is provided on the one cavity surface. The method further includes filling the space with a plastic resin material, solidifying the resin material, and removing the solidified resin material from the mold.

9 Claims, 4 Drawing Sheets

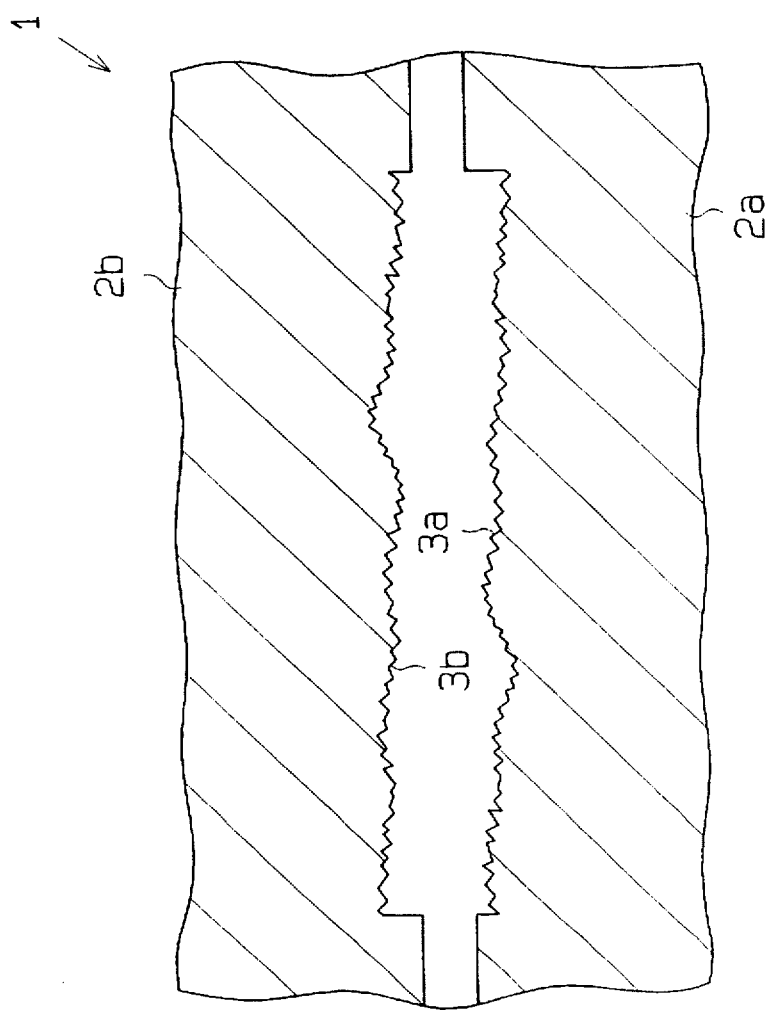
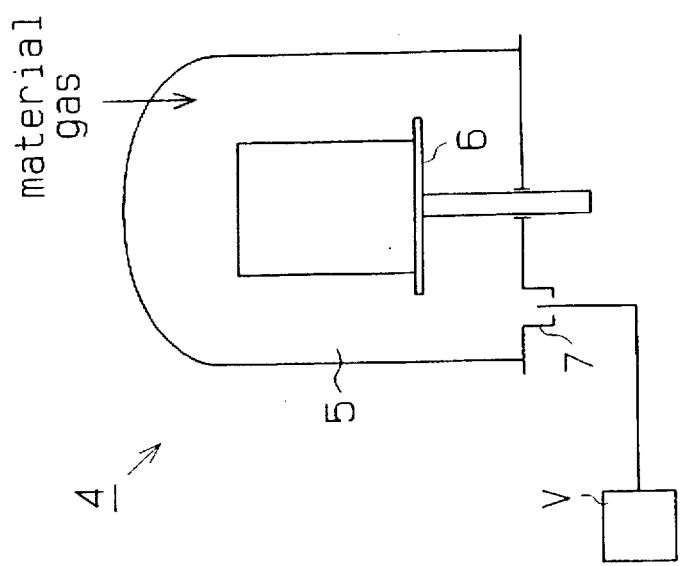

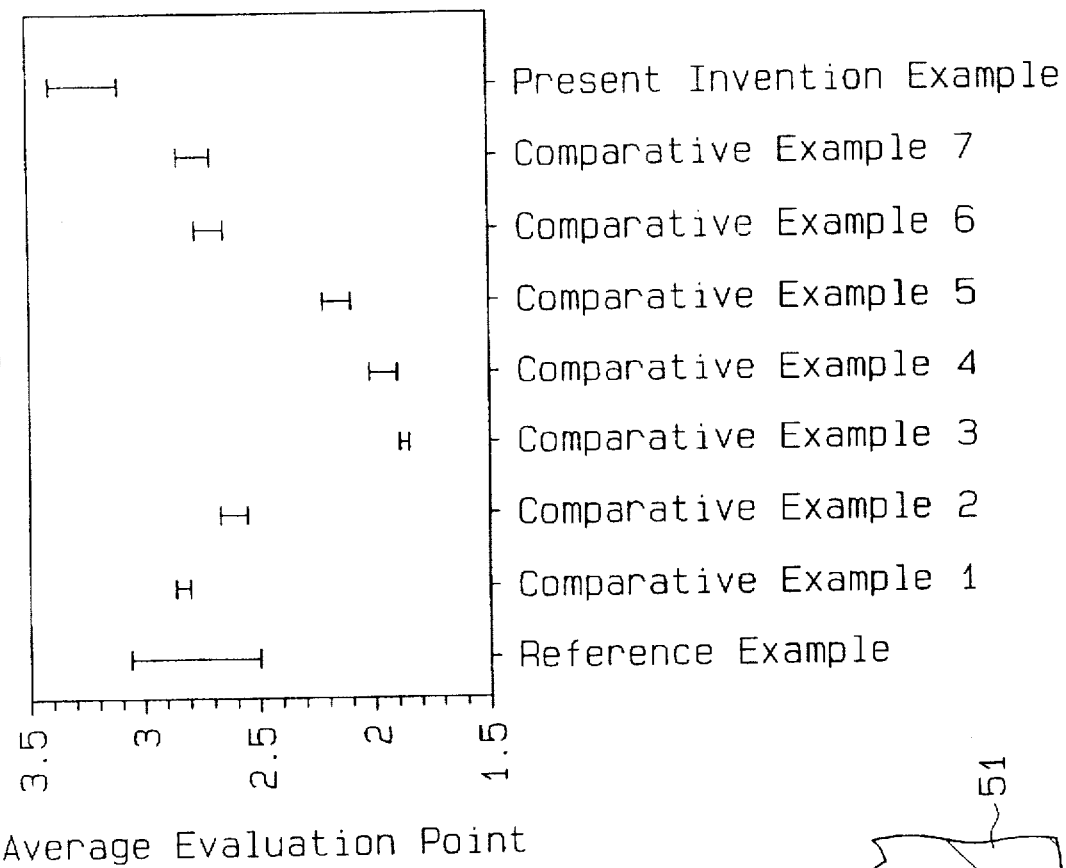
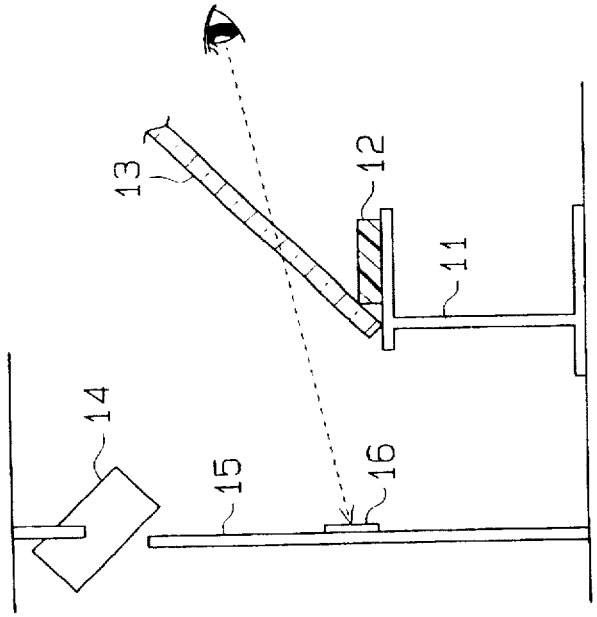
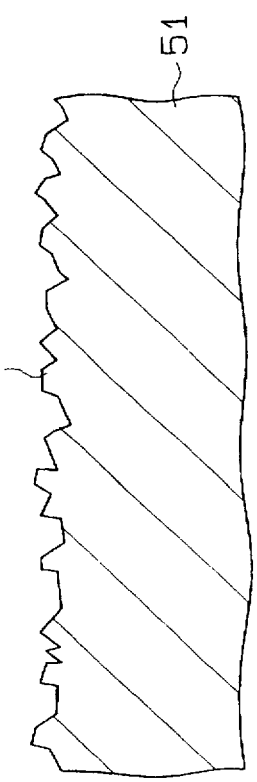

METHOD OF MOLDING A PRODUCT HAVING LOW GLOSS SURFACE

BACKGROUND OF THE INVENTION

The Priority documents, Japanese Patent Application No. 7-068316, filed in Japan on Mar. 27, 1995 and Japanese Patent Application No. 7-146548, filed in Japan on Jun. 13, 1995, and Japanese Patent Application No. 7-324616, filed in Japan on Dec. 13, 1995, are hereby incorporated into the present specification by this reference.

FIELD OF THE INVENTION

The present invention generally relates to a molded product, and more particularly, to a resin molded product having a low gloss surface and a method for manufacturing the same.

DESCRIPTION OF RELATED ART

It is generally known that a resin product having a delustered surface, or a low-gloss surface, has a luxurious appearance. Therefore, the demand in using such resin products for ornaments of automotive parts and furniture is increasing.

Blasting treatment, such as grid blasting and sand blasting, is utilized to obtain a low-gloss molded product. A typical blasting treatment blasts particles such as metal coarse grains, sand, or abrasives against a cavity surface of a mold.

The particles chip off the cavity surface with its kinetic energy and roughens the cavity surface. Accordingly, the molded product, having a delustered surface, is obtained by using the mold having a toughened cavity surface.

This prior art treatment, however, creates a problem. Even the smallest particles blasted against the cavity surface has a diameter of two to three micrometers. Therefore, as shown in FIG. 10, there is a limit to the formation of a fine cavity surface 52 of a mold 51 during its roughening. This prevented a low-gloss product with a higher quality from being obtained.

Furthermore, the cavity surface 52 is exposed to the atmosphere and thus subject to an occurrence of rust depending on its material. Accordingly, the cavity surface 52 needs to be coated by rustproof agents when not used.

In addition, the roughened cavity surface 52 is brittle and wears out after contact with a resin workpiece. Therefore, repetitive molding causes the fine projections in the surface 52 to be chipped off and prevents the desired low-gloss product from being obtained.

SUMMARY OF THE INVENTION

It is a major objective of the present invention to provide a molded product having a low-gloss surface with high quality.

It is another objective of the present invention to provide a method that enables a low-gloss molded product to be manufactured constantly over a long period of time.

To achieve the above objectives, a method for manufacturing a resin product with a mold has at least two molds opposed to each other. Each of the molds has a cavity surface. The method includes the steps of performing an ionic nitriding treatment to at least a part of one of the cavity surfaces to form fine projections and recesses therein. A nitride layer is provided on the one cavity surface. The method further includes the steps of filling a plastic resin material between the cavity surfaces, solidifying the resin material, and removing the solidified resin material from the mold.

BRIEF DESCRIPTION OF THE DRAWINGS

The invention, together with objects and advantages thereof, may best be understood by reference to the following description of the presently preferred embodiments together with accompanying drawings in which:

FIG. 1 is a partial, schematic sectional view illustrating a surface of a movable mold according to an embodiment of the present invention;

FIG. 2 is a schematic view illustrating an ionic nitriding apparatus;

FIG. 6 is a schematic view illustrating equipment for measuring glare-proof ability of the molded product;

FIG. 7 is a graph explaining results of measurement of the glare-proof ability of the molded product;

FIG. 10 is a partial schematic sectional view of the mold in the prior art.

DETAILED DESCRIPTION OF THE PRESENTLY PREFERRED EXEMPLARY EMBODIMENT

Figure 3:
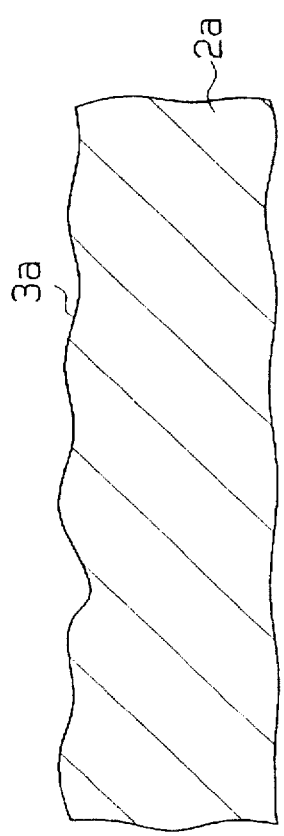
FIG. 3 is a partial, schematic sectional view illustrating the movable mold with a grained surface.

An embodiment of the present invention will hereinafter be described with reference to FIGS. 1 to 9.

FIG. 1 shows a molding device 1 with a movable mold 2a and a fixed mold 2b. The molds 2a, 2b respectively have cavity surfaces 3a, 3b for forming a resin product in a space therebetween. Each of the surfaces 3a, 3b is first grained and at least one of the surfaces 3a, 3b is then treated by ionic nitriding.

The above ionic nitriding is performed by an apparatus 4 as shown in FIG. 2. The apparatus 4 includes a furnace 5 and a platform-like direct current electrode 6 therein. The furnace 5 is communicated with a vacuum pump V by way of a pipe 7, which adjusts pressure in the furnace 5. Material gas, which is a mixture of at least nitrogen gas and oxygen gas, is supplied into the furnace 5.

An explanatory example relating to the ionic nitriding will now be described.

As shown in FIG. 3, the grained cavity surface 3a of the movable mold 2a is pre-treated or de-greased by using acetone, isopropyl alcohol etc. The pre-treated movable mold 2a is fixed on the electrode 6. Then, the vacuum pump V is actuated to reduce the pressure in the furnace 5 to a predetermined magnitude (e.g., 26.6 Pa). Subsequently, the material gas (with the pressure in the range of 260 to 400 Pa and the flow rate at 5 liters/min.) is introduced into the furnace 5. It is noted that the material gas consists of $N_2$, $H_2$ and a mixture of 80% $N_2$ and 20% of CO, the mixture ratio of which is:

N₂:H₂:Mix.(N₂+CO)=2:1:1

Then, plasma is generated by a direct electric current of 8 amps (500 V) flowing between the electrode 6 and an inner wall of the furnace 5, with the electrode 6 serving as an anode and the wall of the furnace 5 serving as a cathode. This raises the temperature of the movable mold 2a to 575 degrees Celsius in about 30 minutes. Subsequently, the temperature of the mold 2a is kept at a predetermined value. While the temperature is kept constant, the mold 2a is subject to ionic nitriding treatment for a predetermined time period (e.g., 3 hours). At this stage, the direct current of 4 amps (voltage 600 V), for example, flows in the mold 2a. When the above predetermined time period is elapsed, the electric discharge is terminated. In this state, the mold 2a is taken out from the furnace after being cooled for a predetermined time period (e.g., 1 hour).

The mold 2a has the cavity surface 3a which was subject to the ionic nitriding treatment. During this treatment, ions such as nitrogen ion, hydrogen ion etc. collide against the surface 3a. The generated kinetic energy causes the cavity surface 3a to be etched and thus roughens it. Accordingly, the roughening results in the formation of fine projections and recesses on the surface 3a.

The ions colliding against the cavity surface 3a raises the temperature of the surface 3a. Accordingly, nitrogen atoms are dispersed in the surface of the mold 2a. Simultaneously, a nitriding layer is formed on the cavity surface 3a due to the chemical reaction resulting from the ions colliding against the cavity surface 3a. The interaction of these operations provides the mold 2a with a finely roughened surface 3a. Furthermore, the dispersion of the nitrogen atoms enhances the hardness of the surface of the movable mold 2. As a result, abrasion of the fine surface 3a is suppressed when used for a long period of time. This improves the durability of the device 1.

Additionally, the chemical reaction caused by the ion collision forms a nitriding layer ($Fe_2N$, $Fe_3N$, $Fe_4N$) on the cavity surface 3a. Therefore, oxidization of the surface 3a is suppressed. This eliminates the necessity of coating a rust-proof agent on the surface 3a, and allows an improvement in productivity and contributes to reducing cost.

(Confirmatory Experiment 1)

Experiments were carried out by the applicants to confirm the above effects. In the experiment, two molds, both made of carbon steel (SC based S55C), were prepared. Conventional blasting treatment was applied to one of the molds while ionic nitriding treatment according to the present invention was applied to the other mold. One experiment focused on the hardness of each mold.

The experiment revealed that the conventional mold had a hardness of 300 Hv (Vickers Hardness), and the mold of the present invention had a hardness of 600 Hv. For measurement of corrosive resistance, another experiment was carried out. In this experiment, the conventional mold, which had not been treated by ionic nitriding, and four molds, which had been treated by ionic nitriding, were prepared for comparison. The four molds were respectively exposed to ionic nitriding treatment for 0.3 hours, 1 hour, 3 hours, and 31 hours. Water containing salt was sprayed to each mold to confirm the development of rust. The results of the experiment are shown in Table 1.

TABLE 1

|  | Experimental Time (min.) | | | |
|---|---|---|---|---|
|  | 15 | 30 | 60 | 120 |
| No Treatment | X | X | X | X |
| Treatment for 0.3 h | O | O | O | O |
| Treatment for 1 h | O | O | O | O |
| Treatment for 3 h | O | O | O | O |
| Treatment for 31 h | ■ | ■ | ■ | ■ |

X: development of rust
O: little development of rust
■: no development of rust

As shown in Table 1, the molds applied with ionic nitriding treatment develops little rust and allows a drastically improved corrosion resistance in comparison with the conventional mold.

The above movable mold 2a is advantageous when injection molding a resin product. The ionic nitriding enables the cavity surface 3a to have a finely roughened surface. This allows the resulting resin product molded by the cavity surface 3a to have a delustered and low-gloss surface.

(Confirmatory Experiment 2)

Table 2 shows gloss measurements for the molded products of the prior art and the present invention taken from various view angles. It is noted that a digital gloss meter UGV-5K and an SM color computer SM-5 were used for measurements according to the JIS Z8741 regulation, the disclosure of which is hereby incorporated into the present specification by this reference. The molded products were made from polypropylene and formed using conventional injection molding methods.

TABLE 2

| Measuring | Prior Art | | Present Invention | |
|---|---|---|---|---|
| Angle | Product | Mold | Product | Mold |
| 20° | 0.2 |  | 0.1 |  |
| 45° | 1.3 |  | 0.5 |  |
| 60° | 2.0 | 1.5 | 0.8 | 0.3 |
| 75° | 8.6 |  | 2.8 |  |
| 85° | 5.6 |  | 2.4 |  |

Unit: gloss

It is apparent from Table 2 that the product according to the present invention had low gloss when measured from each viewing angle.

Figure 4:
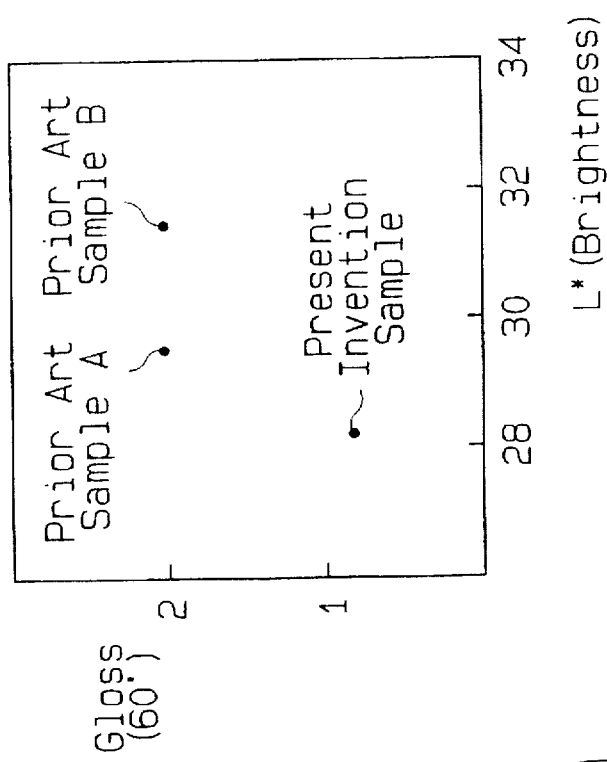
FIG. 4 is a graph explaining relationship between brightness and gloss of the molded product.

According to the present invention, the cavity surface 3a of the movable mold 2a is grained beforehand. The rather roughly grained cavity surface 3a is then exposed to ionic nitriding. This enables the surface 3a to become finely roughened. Therefore, as shown in FIG. 4, the product has not only has low-gloss, but also has low brightness. This drastically improves the quality in appearance of the product. It is noted that, in FIG. 4, prior art sample A was a product formed by a mold of which surface was grained in a leather-like manner and then blast treated. Prior art sample B was a product formed by a mold of which surface was grained in a leather-like manner and then painted. A sample product according to the present invention was formed by a mold having a surface grained in a leather-like manner and then treated with ionic nitriding for three hours. In general, a decrease in gloss causes an increase in brightness. However, as shown in FIG. 4, the gloss and the brightness are both decreased in the molded product of the present invention.

(Confirmatory Experiment 3)

Figure 5:
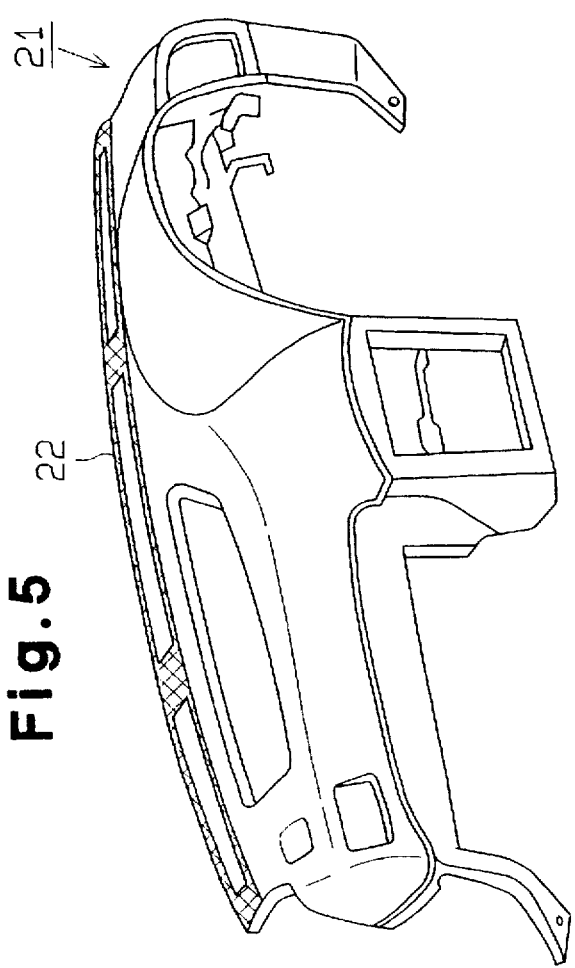
FIG. 5 is a perspective view illustrating an instrument panel as a molded product provided by the method of the present invention.

Molding of an outer piece 22 on an instrument panel 21, shown in FIG. 5, with the movable mold 2a will now be described. The outer piece 22 is made from polypropylene with the conventional injection molding method. In general, the outer piece 22, which is located near a front windshield (not shown), is a vehicle interior component that is required to be reflection-proof with respect to the front windshield.

In this embodiment, since ionic nitriding treatment is applied to the cavity surface 3a of the movable mold 2a, the roughened state of the cavity surface 3a becomes extremely fine as described above. Therefore, the surface of the resin product (outer piece 22) molded by the cavity surface 3a, becomes low gloss and allows superior delustering treatment to be applied on the surface.

In addition, the employment of the grained movable mold 2a results in the cavity surface 3a, grained to a rather rough surface beforehand, becoming finely toughened due to the ionic nitriding. Therefore, the quality in appearance of the resulting product (the outer piece 22 of the instrument panel is improved dramatically. That is, the obtained product (outer piece 22) has not only low-gloss but also has low brightness.

Furthermore, an experiment on the glare-proof ability of the molded product (outer piece 22) was also conducted. The glare proof ability of a molded product used, at the front windshield side of the instrument panel 21 as the outer piece 22, was evaluated by comparing a molded product obtained from a conventional molding device and a molded product obtained from the molding device 1 according to the present invention. The equipment used in the experiment is shown in FIG. 6. A molded product 12, corresponding to the outer piece 22 of the instrument panel 21, was placed on a platform 11. A windshield corresponding to the front windshield was located at an acute angle with respect to the product 12. At the outside of the windshield 13, a xenon lamp 14 was located at a position enabling light to be emitted at an angle of incidence of 45 degrees with respect to the product 12. Further, a target mark 16 was provided at a predetermined position on a wall 15 in front of the platform 11.

Six evaluators observed the target mark 16 from the inside of the windshield 13 at a position corresponding to the driver's seat to evaluate the extent of the "reflection" of the product in the windshield 13. The reflection was evaluated by average evaluation points (a full score of "5 points" was given when there was no reflection). The results are shown in FIG. 7. Comparative examples 1–7 refer to the evaluated results of the molded products obtained from the conventional molding device (graining and blasting). Reference example refers to the evaluated result of the comparative example 1 product with glare-proof coating applied thereon.

As shown in FIG. 7, the experiment resulted in a low evaluation of the comparative examples 1–7. However, the molded product of the present invention resulted in a high evaluation indicating that glare-proof ability is equivalent to or higher than the product of the reference example. Thus, it is obvious that the molded product of this embodiment has excellent glare proof ability, and may overcome the inconvenience caused by its reflection in glass windows when it is used as an interior equipment of an automobile (e.g., instrument panel).

(Confirmatory Experiment 4)

The temperature conditions of the ionic nitriding treatment will now be described.

A test piece made of SC based steel (manufactured by NIHON KOUSYUHAKOGYO KABUSHIKIKAISYA, product name: KPM-1) and a test piece made of SCM based steel (manufactured by DAIDOH TOKUSYUKO KABUSHIKIKAISYA, product name: PX-5) were first prepared. "SC" steel is carbon steel for machine structural use and is classified under JISG 4051. "SCM" steel is chrome molybdenum steel and is classified under JIS G 4105. Each 15 test piece was pre-treated by de-greasing it with acetone or isopropyl alcohol. Each test piece was quenched at a temperature of 600 degrees Celsius in advance.

Next, after pretreatment, each test piece was placed on the electrode 6 in the manner described above. After depressurizing the interior of the furnace 5 to a predetermined pressure value (e.g., 2.7 hPa) using the vacuum pump V, material gas [gas pressure 260 to 400 Pa, flow rate 5 L/min., gas flow ratio $N_2:H_2:CO=2.8:1:0.2$ (in the case of SC steel), $N_2:H_2:CO=1:1:0$ (in the case of SCM steel)] was introduced into the furnace 5. The temperature of each test piece was raised to a predetermined value by employing the electrode 6 as an anode and the furnace 5 as a cathode to generate plasma while adjusting the electric current and voltage. The temperature of the test pieces was then maintained at the predetermined value for application of ionic nitriding during a predetermined period of time (1 hour, 3 hours, 10 hours). After the predetermined time period, only the electric discharge was stopped to cool the test pieces for a predetermined period of time (e.g., 1 hour). The test pieces were then taken out from the furnace 5. The mold gloss of the resulting test pieces was measured (measuring angle 60 degrees) using a spectrophotometer in the same manner as described above. The relationship between the mold gloss and the treatment temperature is shown in FIGS. 8 and 9.

Figure 8:
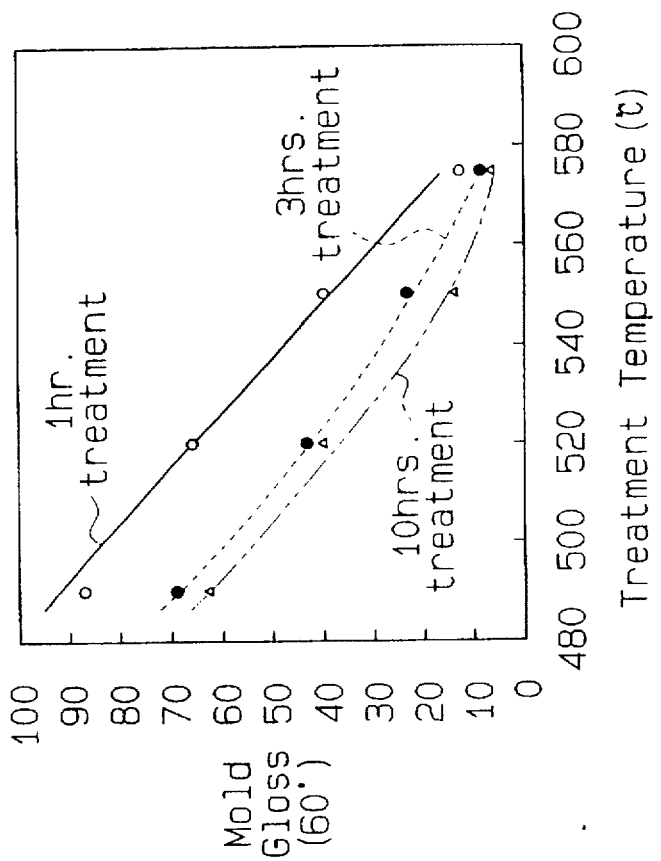
FIG. 8 is a graph explaining relationships between the gloss of a mold made of SC steel and the temperature of ionic nitriding treatment.

FIG. 8 is a graph showing the relationship between the mold gloss and the treatment temperature for the test piece made of SC steel. As apparent from the graph, the gloss of SC steel becomes further reduced when the temperature exceeds 530 degrees Celsius during the treatment. This is considered to be caused by the enhancement of etching and formation of the nitriding layer under higher temperature conditions, which in turn, leads to the grained surface becoming further finely roughened.

Figure 9:
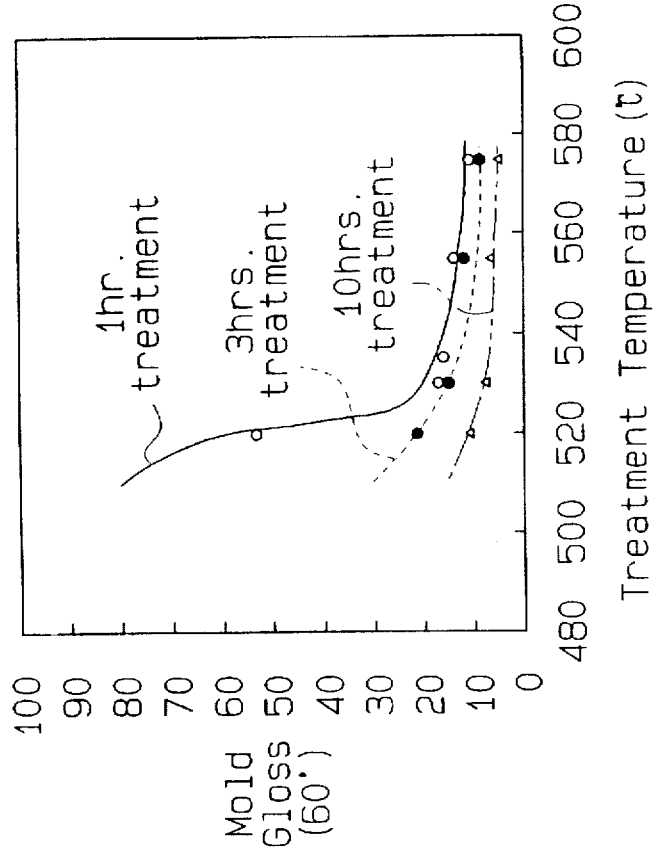
FIG. 9 is a graph explaining relationships between the gloss of a mold made of SCM steel and the temperature of ionic nitriding treatment.

FIG. 9 is a graph showing the relationship between mold gloss and the treatment temperature for the test piece made of SCM steel. As apparent from this graph, the gloss of the SCM steel becomes lower as the temperature becomes higher. It is preferable for the treatment temperature to exceed 520 degrees celsius to obtain low gloss. This is due to the same reasons described above.

Furthermore, it has become known that the gloss becomes further reduced when carbon monoxide is introduced during the ionic nitriding treatment of SC steel. That is, when the conditions were substantially the same as described above (treatment temperature 575 degrees Celsius, treatment time 3 hours) with the mixture ratio being $N_2:H_2:CO=2.8:1:0$, the value of the mold gloss (60 degrees) was 17. However, when the ratio was altered to $N_2:H_2:CO=2.8:1:0.2$, the value of the mold gloss (60 degrees) was reduced to 8. When the ratio was $N_2:H_2:CO=4.0:1:0$, the value of the mold gloss (60 degrees) was 23 but decreased to 15 when altered to $N_2:H_2:CO=4.0:1:0.2$. Therefore, gloss becomes further reduced by using carbon monoxide during ionic nitriding.

It is preferable that the upper limit of the mold temperature be set at a value at which deformation or change in material does not occur. For SC and SCM based steel, the preferable temperature is below 600 degrees Celsius.

Ionic nitriding treatment was also conducted on molds having a grained or blasted surface. As shown below in Table 3, the gloss for a mold made of SC based steel, which was 1.5 before treatment, was lowered to 0.6 when treated at 530 degrees Celsius for three hours. As for a mold made of SCM based steel, the gloss was lowered from 1.5 to 1.0 when treated at 520 degrees Celsius for three hours. The gloss for both types of molds was measured from an angle of 60 degrees.

TABLE 3

| Before Treatment | After Treatment | |
|---|---|---|
| | SC Steel | SCM Steel |
| 1.5 | 0.6 | 1.0 |

Although only one embodiment of the present invention has been described herein, it should be apparent to those skilled in the art that the present invention may be embodied in many other specific forms without departing from the spirit or scope of the invention. Particularly, it should be understood that the present invention may also be modified for example, as described below.

(1) The embodiment described above is employed to mold a resin product. However, the present invention may be embodied in an apparatus used to mold metal products.

(2) In the embodiment described above, ionic nitriding is applied to the cavity surface 3a of the movable mold 2a. However, the ionic nitriding may also be applied on the surfaces of a fixed mold or sectional mold. Furthermore, ionic nitriding may be applied to a portion of the cavity surface 3a instead of the entire surface 3a.

(3) The treatment condition during ionic nitriding is not restricted to the conditions described above.

(4) Ionic nitriding is applied to a grained cavity surface 3a. However, the graining may be omitted. Further, blasting may be performed instead of graining. This will also allow an improved quality in appearance in the same manner as when the graining is performed. Furthermore, both graining and blasting may be performed before applying the treatment according to the present invention.

Therefore, the present examples and embodiments are to be considered as illustrative and not restrictive and the invention is not to be limited to the details given herein, but may be modified within the scope of the appended claims.

What is claimed is:

1. A method for manufacturing a product with a mold assembly having at least two molds opposed to each other, wherein each of said molds has a cavity surface defining a space between, said method comprising steps of:

performing an ionic nitriding treatment at a treatment temperature higher than 530° C. to at least a part of at least one of the cavity surfaces to form fine projections and recesses therein, and forming a nitride on at least said part of said at least one cavity surface;

filling the space with a molding material;

solidifying the molding material in the space to define the product; and removing the product from the mold.

2. The method as set forth in claim 1 further including a step of performing one of grain finishing and blasting finishing on at least said part of the at least one cavity surface prior to the ionic nitriding treatment thereof.

3. The method as set forth in claim 2, wherein the gloss of the cavity surface at a viewing angle of 60° is equal to or less than 1.0 gloss.

4. The method as set forth in claim 2, wherein said ionic nitriding treatment is performed in an ionic nitriding device including a furnace accommodating a direct current electrode, said furnace communicating with a vacuum pump to decrease inner pressure therein.

5. The method as set forth in claim 1, wherein carbon monoxide is introduced to the furnace for performing the ionic nitriding treatment.

6. The method according to claim 1, wherein the step of filling the space includes filling the space with a resin material.

7. The method as set forth in claim 1, wherein each of said molds is formed of a carbon steel.

8. The method as set forth in claim 7, wherein carbon monoxide is introduced to the furnace for performing the ionic nitriding treatment.

9. A method for manufacturing a product with a mold assembly having at least two molds opposed to each other, wherein each of said molds is formed of a chrome molybdenum steel and has a cavity surface defining a space between, said method comprising steps of:

performing an ionic nitriding treatment at a treatment temperature higher than 520° C. to at least a part of at least one of the cavity surfaces to form fine projections and recesses therein, and forming a nitride on at least said part of said at least one cavity surface;

filling the space with a molding material;

solidifying the molding material in the space to define the product; and removing the product from the mold.

* * * * *